Nov. 19, 1963  M. VANZO ETAL  3,111,443
APPARATUS FOR MANUFACTURING TIRES
Filed Dec. 17, 1958  3 Sheets-Sheet 1
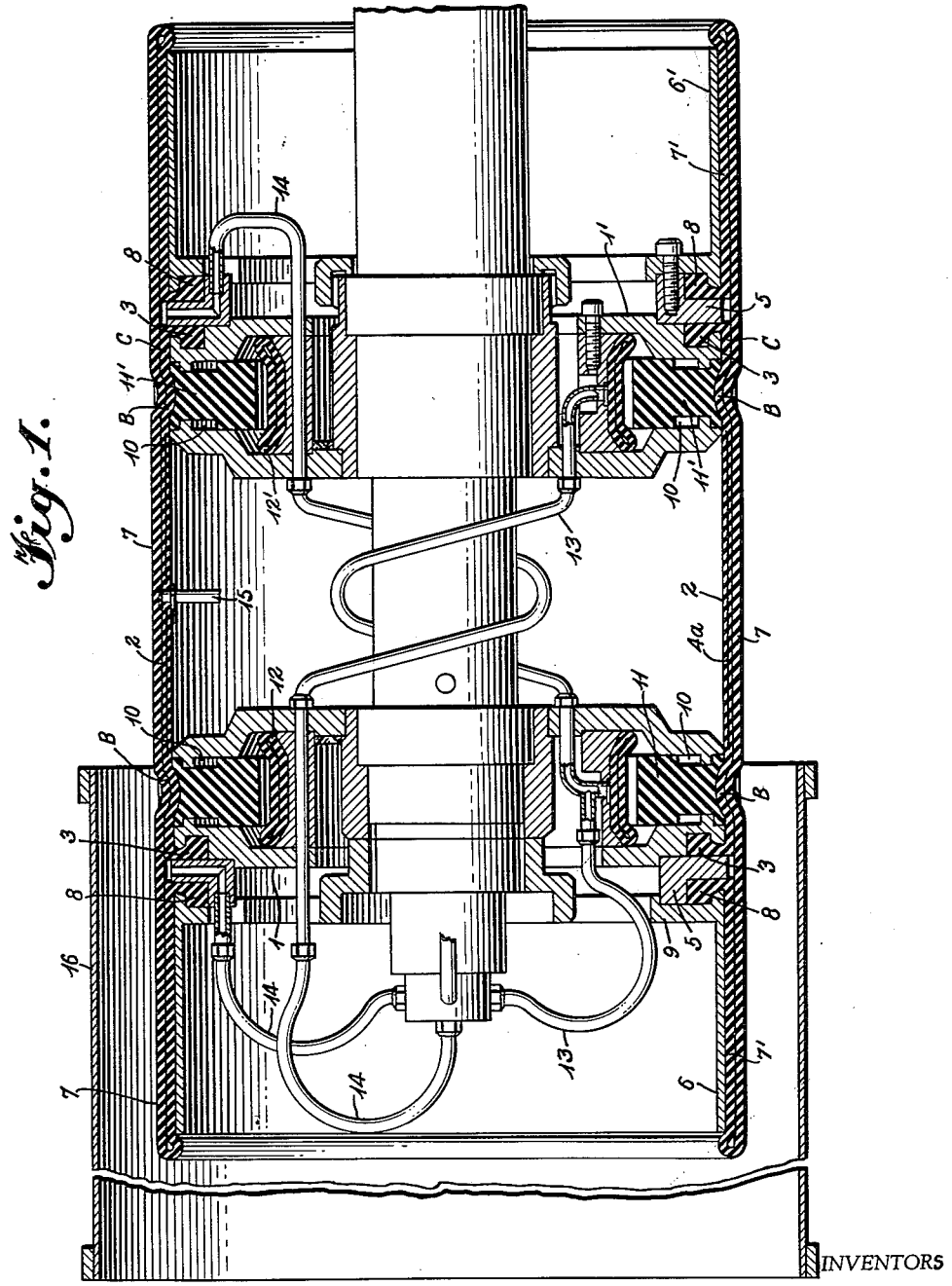
INVENTORS
MARCELLO VANZO,
DARIO GILETTA AND
ANTONIO PACCIARINI
BY *Stevens, Davis, Miller & Mosher*
ATTORNEYS

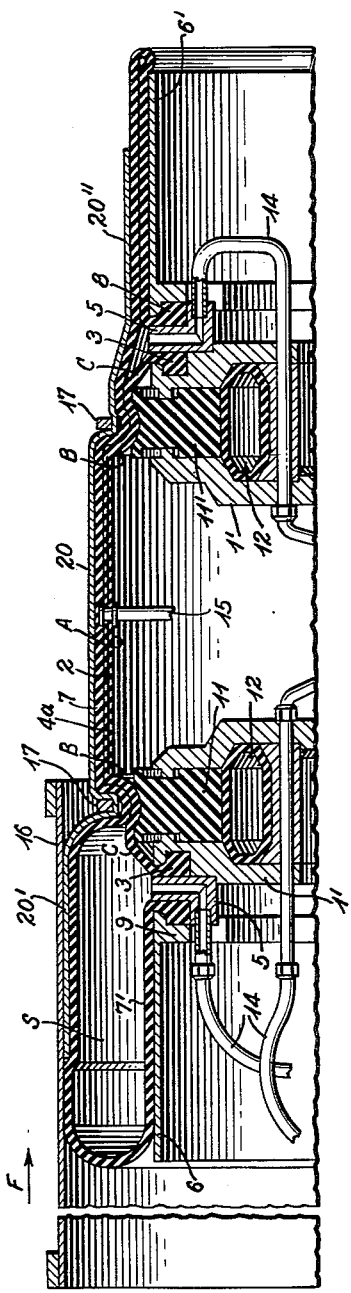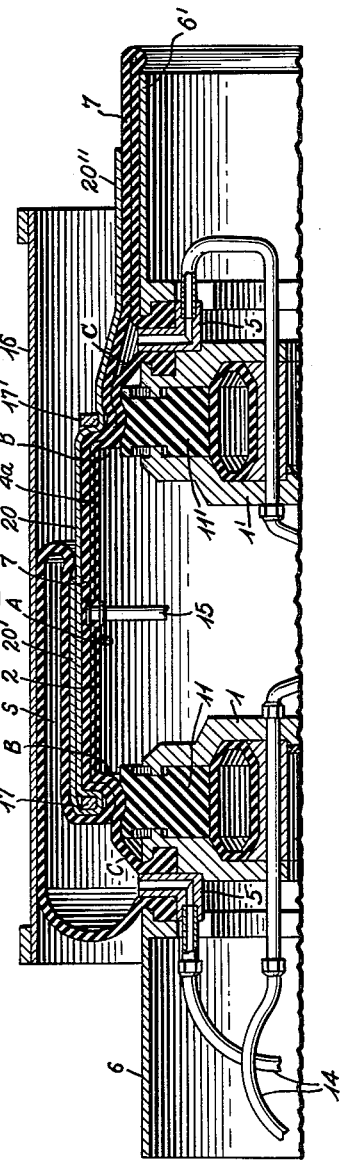

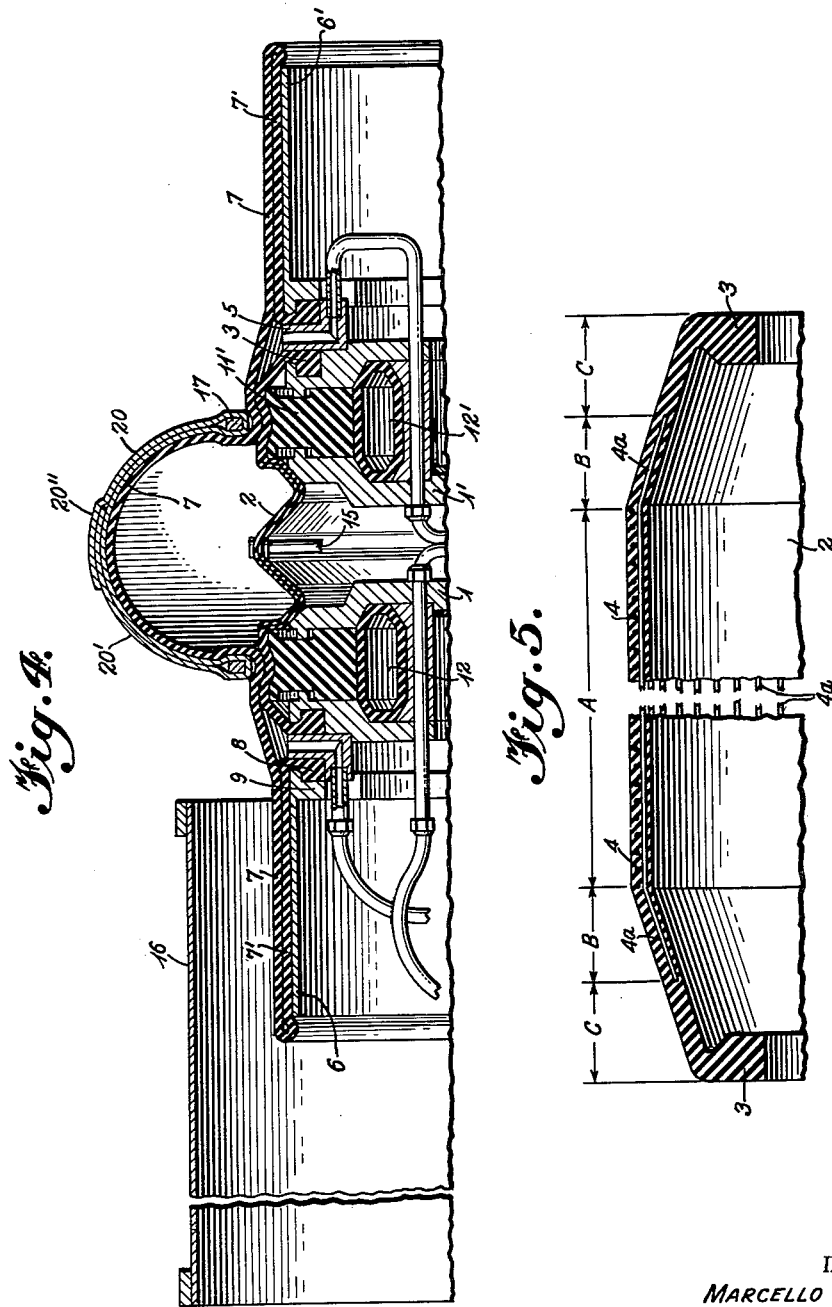

United States Patent Office 3,111,443
Patented Nov. 19, 1963

3,111,443
APPARATUS FOR MANUFACTURING TIRES
Marcello Vanzo, Dario Giletta, and Antonio Pacciarini, Milan, Italy, assignors to Pirelli S.p.A., Milan, Italy
Filed Dec. 17, 1958, Ser. No. 781,137
Claims priority, application Italy Dec. 24, 1957
13 Claims. (Cl. 156—401)

This invention relates to improvements in apparatus for manufacturing tire covers or carcasses on expansible drums of the type disclosed in copending patent application Ser. No. 727,074, filed on April 8, 1958, by the present inventors, now Patent No. 3,053,308, issued September 11, 1962.

The apparatus of the present invention comprises a drum formed by two spaced and rigid side walls and by a flexible tubular membrane, such as of rubber, which extends between the side walls. The membrane is stretched by anchoring means fitted to the outer faces of the side walls. The membrane surface exceeds, in diameter, the side walls and includes, up to the side walls, an internal reinforcement (for instance of textile threads or cords, or metallic threads or cords of the type employed for reinforcing elements in pneumatic tires) adapted to prevent undesired expansion of the membrane, although allowing the same to be flexible or bendable.

Expansible rings, conveniently made of rubber, are mounted in suitable peripheral annular grooves in the side walls of the drum. The expansible rings have arranged beneath them means adapted to expand the said rings. Each of the last-mentioned means conveniently comprises an air hose arranged beneath each ring in the corresponding annular groove.

On the outside of the side walls, and arranged coaxially therewith are a pair of cylindrical crowns of rigid material which serve to extend the effective length of the drum at its ends. Each cylindrical crown is secured, at its inner end, to the hub portion of the adjacent side wall.

Also on the outside of the side walls, the ends of a second resilient membrane, such as of rubber, are attached to the inner ends of the cylindrical crowns in radial planes adjacent the planes in which the first membrane is anchored. This second membrane extends from anchoring means at its ends laterally outward and over the outer surfaces of the cylindrical crowns. The second membrane bends over itself (at its outer ends) as it extends across the entire drum length resulting from the above structure. In this regard, the entire drum may be considered as comprising the first membrane stretched between the two rigid side walls and the two rigid crowns extending laterally from the side walls.

The diameter of the crowns should be such that the second membrane is of a constant diameter throughout its outer development extending between the two free (outer) ends of the above-mentioned crowns.

The expansible rings (and the two membranes overlying them) are conveniently provided with grooves adapted to act as seatings for the bead wires of the tire to be manufactured. The spacing of the mid-planes of the two expansible rings, and hence of the seatings (as long as the side walls are held spaced so as to maintain the cylindrical shape of the first membrane) is such that said spacing corresponds approximately to the development in a plane of the generatrix of the toric surface of the tire being manufactured.

Both drum crowns should be wide enough to permit winding of the edges of the tire plies on the portions of the second membrane superimposed on the crowns. The edges of these plies have to be turned inwardly up on a middle portion of the plies lying between the bead wires, which are assembled in planes of the expansible rings after winding the plies.

The machine comprises means for conveying air under pressure to the spaces which are isolated on both sides of the second membrane by effect of the expansion of the resilient rings against the bead wires, which tightly clamps the two tubular membranes together at these regions. Further means are provided for introducing compressed air into the first membrane to expand it (together with the middle portion of the second membrane) to its larger diameter, which is its manufacturing diameter and beyond which its reinforcement does not admit any further expansion.

Further means, moreover, serve for conveying compressed air between the first membrane and the central portion of the second membrane comprised between the bead wires, subsequent to the turning up of the lateral edges of the plies on the middle portion thereof.

The latter means is caused to act at the same time as a further suitable means draws together the two rigid walls, thereby permitting expansion of the middle portion of the second membrane between the expansible rings, which now takes a toric form, and which causes the plies previously wound and turned up on the drum to take a similar toric shape.

As mentioned above, turning up of the edge zones of the plies (wound on the drum and laterally extending beyond the expansible rings) is carried out as the expansible drum is held in a cylindrical shape by expanding the lateral pockets formed in the second membrane laterally extending beyond the bead wires. In conjunction with this turning-up operation, a substantially cylindrical tubular body is employed which is axially brought over the drum on the side where it is desired to turn the edge of the plies. By inflation of the corresponding pocket described above, the portion of the second membrane extending beyond its respective bead wire expands up to the inner surface of said tubular body. The tubular body is now moved axially towards the middle portion of the drum.

The high coefficient of friction between the inner surface of the tubular body and pocket surface (covered in part by the plies to be turned up) causes the top portion of the inflated pocket to be carried along, which causes the said plies to be wound about the bead wire and upon the middle portion of the plies.

The operation effected in the above-mentioned manner on one lateral pocket is subsequently carried out on the opposite side on the other lateral pocket to turn up the other edge of the plies.

Upon turning up the two edges of the plies in the manner described above, the expansible rings being maintained in their expanded condition, the side walls of the drum are drawn together while compressed air is forced into the space formed between the first tubular membrane and middle portion of the second membrane comprised between the said rings, to cause the said portion of the second membrane to take a toric shape, as well as the plies wound thereon.

Under these conditions the structure of the tire is completed by applying rubber sidewalls and tread to the carcass.

The invention shall be described in greater detail with reference to the accompanying drawings which show diagrammatically, and by way of a non-limiting example, an embodiment thereof.

FIGURE 1 is an axial sectional view of the apparatus of this invention as the same appears prior to the winding of the plies thereon;

FIGURES 2 and 3 are similar axial sectional views showing the apparatus of FIGURE 1 during two successive operations;

FIGURE 4 is an axial sectional view showing the step during which the wound plies are caused to take a toric shape for the final steps of the tire manufacturing process; and FIGURE 5 is an axial sectional view of the structure of the inner membrane.

The drum comprises two circular sidewalls 1 and 1', respectively, between which a tubular membrane 2 is assembled, the enlarged edges 3 of which are anchored to the outer surface of the said side walls in a fluid-tight manner.

As will be seen from FIGURE 5, the membrane 2 comprises a middle portion A, two end regions C, and two intermediate regions B. The regions C, are made of rubber without reinforcement, so that they can freely and resiliently expand in all directions. The regions A and B, have flexible reinforcing textile threads or wires 4a longitudinally extending therethrough, the region A also having a circumferential reinforcing thread or wire 4, which is, for instance, helically wound coaxially with the membrane. The term "wire" as it is employed hereinafter should be construed as including substantially inextensible textile threads, metallic wire, or other elongated reinforcement which is flexible but substantially inextensible. It will be understood therefore, that the region A, though it is flexible and deformable, is not resiliently extensible in any direction and tends to maintain its original cylindrical configuration. However, the regions B, having longitudinal reinforcing wires 4a only, can resiliently expand in a radial, but not longitudinal direction. The original diameter of the region A is larger than the original diameter of the side walls 1 and 1'.

It should be noted that, for the sake of clearness, FIGURES 1–4 show only the longitudinal wires 4a, the reinforcement 4 having been omitted. It will be seen from these figures that the region A of the membrane ends adjacent but short of the side walls.

Attachment of the enlarged edges 3 of the membrane 2 is effected by radial rings 5 which are secured to the outside of the side walls. The rings 5 have secured thereto the radial hubs 9 of two cylindrical crowns 6 and 6' coaxial with the drum body.

A second membrane 7 extends across the length of the drum, including its lateral cylindrical crowns 6 and 6'. At the inner edges of the crowns, the second membrane is inturned and attached by its edges 8 to a portion fast with the drum side walls near the attachment of the first membrane 2.

The rigid side walls of the drum are formed at their periphery with a radial annular groove 10 having mounted therein expansible rings 11 and 11', conveniently made of rubber, beneath which annular air hoses 12 and 12' are mounted. These air hoses can be inflated in order to expand, at the desired moment, the rings 11 and 11' by compressed air which is conveyed through the conduits 13. Conduits 14 convey compressed air beneath the membrane 7 in the region of the expansible rings 11 and 11' and between the membrane ends 3 and 8. The conduits 15 convey compressed air between the central portion of the membrane 7 confined between the two expansible rings 11 and 11' and the non-expansible region of the inner membrane 2. The expansible regions C of the membrane 2 are situated outside the expansible rings 11 and 11', the part-expansible regions B encircling the rings 11 and 11'.

As shown in FIGURES 2 and 3, but before reaching the condition shown in FIGURE 2, the plies 20 are wound on the membrane 7, and the bead wires 17 are assembled in the middle plane of the respective rings 11 and 11', whereupon the latter are expanded by means of compressed air admitted into the air hoses 12 and 12' until the said membranes are urged against the bead wires. It should be noted that plies 20 have laterally extending zones 20' and 20" overlying the left and right portions, respectively, of the membrane 7. Compressed air is then admitted into the space between the side walls underlying the first mentioned membrane 2, the side walls 1 and 1' at the same time being slightly drawn together.

The membrane 2 then takes a tubular shape as shown in FIGURE 2, its larger diameter being its manufacturing diameter without any possibility of further expansion due to the reinforcement enclosed thereby, except for the lateral bands B and C. The bands B, through the interposition of a corresponding portion of the second membrane 7, are thus urged against the sides of the bead wires as shown in FIGURES 2 and 3.

A rigid tubular body 16 coaxial with the drum is then moved forward, as shown in FIGURE 2, until the right-hand end of this body overlies the bead wire situated on the same drum side. Compressed air is then admitted through the associated conduit 14 into the pocket S situated on the same side of the membrane 7, this pocket being tightly closed by clamping effected by the expansible ring 11 against the associated bead wires 17.

The pocket S is formed so that the edge zone 20' of the plies is urged against the inner surface of the tubular body 16. The body 16 is then moved forward in the direction of the arrow F (by means not shown). The high coefficient of friction between the pocket and tubular body 16 causes the pocket to be carried along by the tubular body, thereby fully winding the plies about the associated bead wires 17 and gradually turning up the edge zone 20' of the plies against the middle portion 20 of the plies as shown in FIGURE 3.

The step just described in connection with the pocket S is subsequently carried on in connection with the pocket on the other side of the drum in order to turn up the other edge zone 20" of the plies on the middle portion 20, and possibly superposing it on the end of the previously turned over edge of zone 20'.

To complete the manufacture of the tire, the side walls 1 and 1' are drawn together, as indicated in FIGURE 4, and compressed air is introduced simultaneously into the space between the membrane 2 and the middle portion of the membrane 7 confined between the bead wires (after discharging the compressed air from the lateral pockets). The movement of the side walls 1 and 1' relative to each other can be accomplished, for example, in the manner disclosed in our prior copending application Serial No. 727,074, filed April 8, 1958, now Patent No. 3,053,308, issued September 11, 1962, and to this extent, the present application constitutes a continuation-in-part over the aforementioned copending application. This same type of movement of the side walls relative to each other can be effected in any other well known manner, as for example, in our prior Patent No. 3,035,629 (copending with the instant application) or Vanzo et al. Patent No. 2,814,330. The central portion of the membrane 7 with the plies wound thereon then takes the toric form shown in the FIGURE 4. As it is held under these conditions, the tire is completed by applying the side walls and the tread.

In order to prevent the membrane 2 from deforming towards the drum axis by effect of the pressure required to cause the membrane 7 to take its toric shape, the air pressure in the cavity confined by the membrane 2 and side walls 1 and 1' is adjusted so that the membrane 2 is subjected approximately to the same pressure on both sides.

Other and further modifications of this invention, apart from those shown or suggested herein, may be made within the spirit and scope of the present invention.

What is claimed is:

1. In a tire building drum the combination of two rigid circular side walls axially aligned and axially displaceable relative to each other, and a reinforced tubular membrane extending between the walls and having its opposite end edges attached in a fluid tight manner to said side walls, the said membrane comprising resiliently extensible and flexible annular end regions adjacent the side walls and a flexible but resiliently non-extensible intermediate annular region extending between and connected with said annular end regions, the undeformed normal configuration of the said intermediate region being cylindrical and the diameter of the said intermediate region in an undeformed condition exceeding the maximum diameter of the said side walls, and a circumferential groove in each side wall underlying the adjacent annular end region of said membrane and having an effective diameter variable to a predetermined maximum value exceeding the maximum outer diameter of its respective side wall.

2. In a drum as claimed in claim 1, including a second membrane overlying said reinforced membrane and having its opposite end edges attached in a fluid tight manner to said side walls, and a tubular connection extending through the said intermediate annular region of the reinforced membrane radially from the inside to the outside and opening on the outer surface of the reinforced membrane.

3. In a drum as claimed in claim 1, a reinforcement comprising circumferential and longitudinal wires in said intermediate annular region of the membrane, the longitudinal wires extending beyond the boundaries of said intermediate region provide two further flexible and only radially extensible annular regions, the said two further regions encircling the side walls and adjoining the resiliently extensible and flexible regions.

4. In a tire building drum the combination of two axially aligned rigid circular side walls axially displaceable relative to each other, a reinforced tubular membrane of a resilient material extending between the side walls having its opposite end edges attached in a fluid tight manner to a peripheral region of said side walls, and a reinforcement of a flexible but substantially non-extensible material incorporated in said membrane over a length smaller than the membrane length thereby providing in the membrane two resilient extensible annular end regions adjacent the side walls separated by an intermediate annular flexible and resiliently non-extensible region extending between and connected with said annular end regions, the undeformed normal configuration of said intermediate region being cylindrical and the diameter of said intermediate region in an undeformed condition exceeding the maximum diameter of said side walls, and a circumferential groove in each side wall underlying the adjacent annular end region of said membrane and having an effective diameter variable to a predetermined maximum value exceeding the maximum outer diameter of its respective side wall.

5. In a drum as claimed in claim 4, including a second membrane overlying said reinforced membrane and having its opposite end edges attached in a fluid tight manner to said side walls, and a tubular connection extending through the said intermediate annular region of the reinforced membrane radially from the inside to the outside and opening on the outer surface of the reinforced membrane.

6. In a tire building drum the combination of two rigid axially aligned circular side walls axially displaceable relative to each other, and a reinforced tubular membrane extending between the side walls and having its end edges attached in a fluid tight manner to the outer faces of the side walls, said membrane comprising two annular end regions overlying the circumferential surfaces of the respective side walls, said two annular end regions being resiliently extensible and foldable, and an intermediate flexible but resiliently non-extensible annular region extending between and connected with said annular end regions, the undeformed normal configuration of said intermediate region being cylindrical and the diameter of the said intermediate annular region in an undeformed condition exceeding the maximum diameter of the said side walls, and a circumferential groove in each side wall underlying the adjacent annular end region of said membrane and having an effective diameter variable to a predetermined maximum value exceeding the maximum outer diameter of its respective side wall.

7. In a tire building drum a pair of axially aligned rigid circular side walls axially displaceable relative to each other, a circumferential groove in each side wall having an effective diameter variable to a predetermined maximum value exceeding the maximum outer diameter of its respective side wall, a reinforced tubular membrane extending between said side walls and having its end edges attached in a fluid tight manner to the outer faces of said side walls so that said membrane comprises two annular end regions adapted to overlie the respective circumferential grooves, the said two regions being resiliently extensible and flexible, and an intermediate annular region which is flexible but resiliently non-extensible, said intermediate annular regions extending between and connected with said annular end regions, the undeformed normal configuration of the said intermediate region being cylindrical and the diameter of the said intermediate region in an undeformed condition exceeding said maximum value of the diameter of the grooves.

8. In combination with a drum as claimed in claim 7, a rigid cylindrical extension on each side wall extending axially outward in a direction away from the other side wall, each said cylindrical extension being coaxial with its side wall and having an outer diameter substantially equal to the maximum outer diameter of its said side wall, a second tubular membrane fitted on the drum and made entirely of an extensible resilient material, said second membrane having end regions inturned to superpose on the axial length of the said cylindrical extensions and having end edges clamped in a fluid tight manner in positions between said extensions and said side walls, means for introducing fluid under pressure into the space between said reinforced membrane and the region of the said second membrane axially situated between the said circumferential seatings, means for introducing fluid under pressure into the regions of the said second membrane adjacent the said cylindrical extensions, and a tubular member movable over the drum telescopically with respect to the latter.

9. In combination with a drum as claimed in claim 1, a rigid cylindrical extension on each side wall extending axially outward in a direction away from the other side wall, each said cylindrical extension being coaxial with its side wall and having an outer diameter substantially equal to the maximum outer diameter of its said side wall, a second tubular membrane fitted on the drum and made entirely of an extensible resilient material, said second membrane having end regions inturned to superpose on the axial length of the said cylindrical extensions and having end edges clamped in a fluid tight manner in positions between said extensions and said side walls, means for introducing fluid under pressure into the space between said reinforced membrane and the region of the said second membrane axially situated between the said side walls, means for introducing fluid under pressure into the regions of the said second membrane adjacent the said cylindrical extensions, and a tubular member movable over the drum telescopically with respect to the latter.

10. In combination with a drum as claimed in claim 4, a rigid cylindrical extension on each side wall extending axially outward in a direction away from the other side wall, each said cylindrical extension being coaxial with its side wall and having an outer diameter substantially equal to the maximum outer diameter of its said side wall, a second tubular membrane fitted on the drum and made entirely of an extensible resilient material, said second membrane having end regions inturned to superpose on the axial length of the said cylindrical extensions and having end edges clamped in a fluid tight manner in positions between said extensions and said side walls, means for introducing fluid under pressure into the space between said reinforced membrane and the region of the said second membrane axially situated between the said side walls, means for introducing fluid under pressure into the regions of the said second membrane adjacent the said cylindrical extensions, and a tubular member movable over the drum telescopically with respect to the latter.

11. In combination with a drum as claimed in claim 6, a rigid cylindrical extension on each side wall extending axially outward in a direction away from the other side wall, each said cylindrical extension being coaxial with its side wall and having an outer diameter substantially equal to the maximum outer diameter of its said side wall, a second tubular membrane fitted on the drum and made entirely of an extensible resilient material, said second membrane having end regions inturned to superpose on the axial length of the said cylindrical extensions and having end edges clamped in a fluid tight manner in positions between said extensions and said side walls, means for introducing fluid under pressure into the space between said reinforced membrane and the region of the said second membrane axially situated between the said side walls, means for introducing fluid under pressure into the regions of the said second membrane adjacent the said cylindrical extensions, and a tubular member movable over the drum telescopically with respect to the latter.

12. In a tire building drum, the combination of two rigid circular side walls axially aligned and axially displaceable relative to each other and a reinforced tubular membrane extending between said side walls and having each of its opposite end edges attached in a fluid tight manner to a peripheral region of its associate side wall, said membrane comprising a middle annular region, two end annular regions adjacent the side wall, and two intermediate annular regions joining the middle annular region with the two end annular regions, said middle annular region being flexible but substantially inextensible in all directions, said intermediate annular regions being flexible and only radially extensible, said end annular regions being flexible and resiliently extensible, the undeformed normal configuration of said middle annular region being cylindrical and the diameter of said middle annular region in an undeformed condition exceeding the maximum diameter of said side walls, and a circumferential groove in each side wall underlying the adjacent end annular region of said membrane and having an effective diameter variable to a predetermined maximum value exceeding the maximum outer diameter of its respective side wall.

13. Apparatus as set forth in claim 12 wherein said tubular membrane is provided with a reinforcement comprising circumferential wires in said middle annular region only and longitudinal wires extending through said middle annular region and into said two intermediate annular regions, said end annular regions being devoid of reinforcements.

References Cited in the file of this patent

UNITED STATES PATENTS

| | | |
|---|---|---|
| 1,525,455 | Logan | Feb. 10, 1925 |
| 1,789,143 | Kraft | Jan. 13, 1931 |
| 2,084,009 | Sohl | June 15, 1937 |
| 2,182,176 | Maranville | Dec. 5, 1939 |
| 2,565,071 | Frazier | Aug. 21, 1951 |
| 2,715,931 | Frazier | Aug. 23, 1955 |
| 2,717,628 | Wikle | Sept. 13, 1955 |
| 2,871,912 | Kraft | Feb. 3, 1959 |
| 2,935,117 | Pfeifer | May 3, 1960 |
| 2,986,196 | Frazier | May 30, 1961 |